Patented Mar. 18, 1952

2,589,969

UNITED STATES PATENT OFFICE 2,589,969

PRODUCTION OF FULVENE HYDROCARBONS

Henry G. Schutze and Edward F. Wadley, Baytown, Tex., assignors, by mesne assignments, to Standard Oil Development Company, Elizabeth, N. J., a corporation of Delaware No Drawing. Application January 7, 1950, Serial No. 137,476

15 Claims. (Cl. 260—666)

The present invention may be described as involving the reaction of a mixture of a hydrocarbon selected from the group consisting of hydrocarbons containing at least one methylene group allyl to two double bonds and having from 5 to 9 carbon atoms in the molecule and polymers thereof which decompose to form said hydrocarbons and a carbonyl compound, such as a ketone and an aldehyde having from 2 to 5 carbon atoms in the molecule, in the vapor phase at a temperature in the range from 400° to 900° F. by contacting same with a catalyst selected from the group consisting of the oxides of aluminum, magnesium, silicon and mixtures thereof to form a product comprising a fulvene hydrocarbon. The product may be separated from the catalyst and subjected to treatment for recovery of the fulvene hydrocarbon.

In practicing the present invention it is desirable to employ diene hydrocarbons having no less than 5 and no more than 9 carbon atoms to the molecule and containing at least one methylene group allyl to two double bonds. Dimers or polymers of such compounds may also be employed. As illustrations of the type of diolefins or dienes which may be used in the practice of the present invention may be mentioned cyclopentadiene, 1-methyl-1, 3-cyclopentadiene, 2-methyl-1,3 cyclopentadiene, cyclohexadiene-1,4, pentadiene-1,4, hexadiene-1,4, heptadiene-1,4 and indene. The dimers of cyclopentadiene and the two methyl cyclopentadienes mentioned above may also be used since under the conditions at which the reaction takes place these dimers or polymers decompose readily to the cyclopentadiene and the methyl cyclopentadienes.

The carbonyl compounds employed in the practice of the present invention, such as ketones and aldehydes, should contain no less than 2 carbon atoms and no more than 5 carbon atoms in the molecule. As illustrative of the suitable carbonyl compounds mention may be made of acetone, methylethylketone, diethylketone, acetaldehyde, propionaldehyde, butraldehyde, and valeraldehyde.

It is contemplated that the aforementioned hydrocarbons and the carbonyl compounds should be admixed together in the mol ratio in the range of 0.3 to 5 mols of the hydrocarbons per mole of the carbonyl compound. As an example, two volumes of cyclopentadiene may be reacted with one volume of acetone.

Temperatures employed in the practice of the present invention may range from about 400° to about 900° F. with a preferred range from about 400° to about 500° F.

Pressures employed should be sufficient to maintain a vapor phase and may be in the range from about 0. to 50 p. s. i. g. with a preferred pressure of about atmospheric.

The catalyst employed in the practice of the present invention may be oxides of aluminum, magnesium and silicon, or mixtures thereof. For example, silica-alumina or activated bauxite may be used as catalysts.

In conducting the present invention a vaporized mixture of the hydrocarbon and the carbonyl compound may be passed over the catalyst of the type mentioned before arranged in a bed at a temperature in the range from 400° to 900° F. at a feed rate in the range from about 1 to about 5 volumes of feed per volume of catalyst per hour. Under such conditions the aforementioned types of hydrocarbons react with the carbonyl compounds to form fulvene-type hydrocarbons with the elimination of water from the molecule.

The invention will be further illustrated by reference to the following example which illustrates one specific mode thereof. A tubular reactor heated in a combustion furnace was packed with quartz chips in the upper half thereof and in the lower half with commercially available activated bauxite. A feed blend was formed comprising dicyclopentadiene and acetone in a ratio sufficient to give a ratio of 2 volumes of cyclopentadiene to 1 volume of acetone. The reactor, both the upper and lower sections thereof, was heated to 750° F. and the feed blend, such as illustrated, was introduced at atmospheric pressure and at a feed rate equivalent to one liquid volume per volume of catalyst per hour. On introduction of the feed blend the temperature in the upper section of the reactor wherein the quartz chips were located dropped about 100° F. due to the decomposition of dicyclopentadiene to cyclopentadiene, this depolymerization reaction being endothermic. As the feed mixture comprising cyclopentadiene and acetone progressed to the lower section of the reactor the temperature increased about 90° F. because the condensation reaction between cyclopentadiene and acetone is exothermic in nature. A product was formed which was removed from the reactor and recovered. This product was distilled and a middle 50% fraction boiling in the range between 300 and 340° F. was collected. This fraction contained dimethylfulvene which boils at 308° F. at 717 mm. pressure. The presence of dimethylfulvene was determined by analyzing the fraction boiling at the aforementioned range in a mass spectrometer. A portion of the fraction boiling in the range between 300° and 340° F. was blended with an 80 octane number gasoline, 20% of the dimethylfulvene fraction being added to 80% of the 80 octane gasoline. It was determined that the blending value was in excess of 150 Research octane number.

The fraction boiling in the range between 300° and 340° F. possessed a definite yellowish-green color which is characteristic of fulvene compounds (the only pure hydrocarbons in this boiling range having a color).

The present invention may be practiced by adding a carbonyl compound of the type illustrated above to a fraction boiling in the range from about 100 to 300° F. obtained by steam cracking of naphtha and other petroleum fractions such as gas oil and the like. In the Chaney Patent U. S. 2,422,374, it is disclosed that steam cracking of certain hydrocarbons produces a product containing substantial amounts of cyclopentadiene. It is contemplated that a fraction boiling in the range between 100° and 300° F., such as obtained as described by Chaney, may be admixed with a proper amount of a carbonyl compound such as acetone and subjected to reaction in the vapor phase at a temperature in the range between 400° and 900° F. in the presence of a catalyst of the type illustrated.

Hydrocarbons containing a methylene group allyl to two double bonds having from 5 to 9 carbon atoms in the molecule may also be produce by steam cracking fractions boiling in the range between 200° and 400° F. from Refugio and Smackover crudes at a temperature in the range from about 1300° to 1600° F. in the vapor phase. Products produced by such cracking reactions also contain substantial amounts of cyclopentadiene and dimers thereof and 1,4 dienes which may form a feed stock in the practice of the present invention.

It is contemplated that as the product is produced in the practice of the present invention it may have added thereto an oxidation inhibitor to prevent the polymerization of the fulvene hydrocarbons and also to prevent oxidation thereof on contact with air. Oxidation inhibitors which may be added in amounts ranging from 5 to 50 pounds per 1000 barrels of product immediately after formation include 2,6 ditertiary butyl-4-methyl phenol, 2,4 dimethyl-6-tertiary butyl phenol, and n,n'di-secondary butyl-p-phenylene diamine, and the like.

The product may be used as a component of an internal combustion engine fuel in view of the excellent anti-knock characteristics of the fulvene-type compounds. For example, fulvene concentrates may be blended such that about 0.5 to 10 volume per cent concentrations of fulvene-type compounds are contained in a conventional leaded or unleaded fuels comprising straight run or cracked naphthas, products resulting from the alkylation of olefins with paraffins and other types of hydrocarbon fuels. The blends fuels may contain an inhibitor of the type mentioned above in concentrations of about 5 to 50 pounds per 1000 barrels of fuel. The product resulting from treatment of steam cracked naphtha with the carbonyl compounds as heretofore suggested may suitably be distilled to segregate a fraction boiling in the range between 100° and 430° F., and this fraction may be blended with conventional hydrocarbon motor fuels in amounts ranging from about 5 to 50%. Likewise, this fuel may be inhibited with a suitable type of oxidation inhibitor.

The compounds produced in accordance with the present invention may be illustrated by the reaction of cyclopentadiene with acetone. It is postulated that under the conditions obtaining at the high temperature and vapor phase in accordance with the present invention the cyclopentadiene and acetone react as follows:

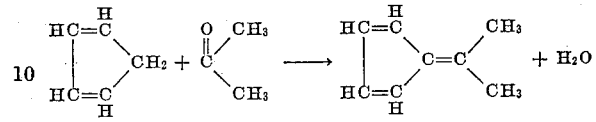

The nature and objects of the present invention having been completely described and illustrated, what we wish to claim as new and useful and secure by Letters Patent is:

1. A method for producing fulvene hydrocarbons which comprises contacting a mixture of a hydrocarbon selected from the group consisting of hydrocarbons containing at least one methylene group allyl to two double bonds and having from 5 to 9 carbon atoms in the molecule and polymers thereof which decompose to form said hydrocarbons and a carbonyl compound having from 2 to 5 carbon atoms in the molecule in the vapor phase at a temperature in the range from 400° to 900° F. with a catalyst selected from the group consisting of aluminum oxide, magnesium oxide, silicon oxide, and mixtures thereof to form a product comprising a fulvene hydrocarbon.

2. A method in accordance with claim 1 in which the hydrocarbon is cyclopentadiene.

3. A method in accordance with claim 1 in which the hydrocarbon is 1-methyl 1,3-cyclopentadiene.

4. A method in accordance with claim 1 in which the hydrocarbon is 2-methyl 1,3-cyclopentadiene.

5. A method in accordance with claim 1 in which the hydrocarbon is pentadiene-1,4.

6. A method in accordance with claim 1 in which the hydrocarbon is dicyclopentadiene.

7. A method in accordance with claim 1 in which the hydrocarbon is selected from the group consisting of cyclopentadiene, 1-methyl-1,3 - cyclopentadiene, 2 - methyl-1,3-cyclopentadiene, cyclohexadiene-1,4, pentadiene-1,4, hexadiene-1,4, heptadiene-1,4, indene, and dicyclopentadiene.

8. A method for producing fulvene hydrocarbons which comprises forming a mixture of a hydrocarbon selected from the group consisting of hydrocarbons containing at least one methylene group allyl to two double bonds and having from 5 to 9 carbon atoms in the molecule and polymers thereof which decompose to form said hydrocarbons and a carbonyl compound having from 2 to 5 carbon atoms in the molecule, heating the mixture to a temperature in the range from 400° to 900° F. and vaporizing same, contacting the vaporized mixture at a temperature in the range from 400° to 900° F. with a catalyst selected from the group consisting of aluminum oxide, magnesium oxide, silicon oxide, and mixtures thereof to form a product comprising a fulvene hydrocarbon, and recovering said product.

9. A method in accordance with claim 8 in which the hydrocarbon is a cyclopentadiene.

10. A method in accordance with claim 8 in which the hydrocarbon is 1-methyl 1,3-cyclopentadiene.

11. A method in accordance with claim 8 in which the hydrocarbon is 2-methyl 1,3-cyclopentadiene.

12. A method in accordance with claim 8 in which the hydrocarbon is pentadiene 1,4.

13. A method in accordance with claim 1 in which the hydrocarbon is dicyclopentadiene.

14. A method for producing fulvene hydrocarbons which comprises forming a mixture of a hydrocarbon selected from the group consisting of hydrocarbons containing at least one methylene group allyl to two double bonds and having from 5 to 9 carbon atoms in the molecule and polymers thereof which decompose to form said hydrocarbons and a carbonyl compound having from 2 to 5 carbon atoms in the molecule in the mol ratio of 0.3 to 5:1, heating said mixture to a temperature in the range between 400° to 900° F. and vaporizing same, contacting said vaporizing mixture at a temperature in the range from 400° to 900° F. and at a pressure in the range from 0 to 50 p. s. i. g. with a catalyst selected from the group consisting of aluminum oxide, magnesium oxide, silicon oxide and mixtures thereof at a feed rate in the range from 1 to 5 volumes of feed per volume of catalyst per hour to form a product comprising a fulvene hydrocarbon, removing said product from contact with said catalyst and recovering said product.

15. A method for producing fulvene hydrocarbons which comprises forming a mixture of a hydrocarbon fraction boiling in the range from about 100° to 300° F. comprising a hydrocarbon selected from the group consisting of hydrocarbons containing at least one methylene group allyl to two double bonds and having from 5 to 9 carbon atoms in the molecule and polymers thereof which decompose to form said hydrocarbons and a carbonyl compound having from 2 to 5 carbon atoms in the molecule, heating said mixture to a temperature in the range from 400° to 900° F. and vaporizing same, contacting said vaporized mixture at a temperature in the range from 400° to 900° F. and at a pressure in the range from 0 to 50 p. s. i. g. with a catalyst selected from the group consisting of aluminum oxide, magnesium oxide, silicon oxide and mixtures thereof to form a product comprising a fulvene hydrocarbon, removing said product from contact with said catalyst and recovering said product.

HENRY G. SCHUTZE.
EDWARD F. WADLEY.

REFERENCES CITED

The following references are of record in the file of this patent:

UNITED STATES PATENTS

| Number | Name | Date |
|---|---|---|
| 2,246,032 | Bent | June 17, 1941 |

OTHER REFERENCES

"The Chemistry and Utilization of Cyclopentadiene" by Wilson et al., Chemical Reviews, No. 1, February 1944.

Faraday's Encyclopedia vol. C8, at page 08022.0011.